US011286813B2

(12) United States Patent
Danis et al.

(10) Patent No.: US 11,286,813 B2
(45) Date of Patent: Mar. 29, 2022

(54) TURBINE RING ASSEMBLY HAVING INDEXED FLANGES

(71) Applicant: SAFRAN AIRCRAFT ENGINES, Paris (FR)

(72) Inventors: Antoine Claude Michel Etienne Danis, Moissy-Cramayel (FR); Clément Jean Pierre Duffau, Moissy-Cramayel (FR); Clément Jarrossay, Moissy-Cramayel (FR); Nicolas Paul Tableau, Moissy-Cramayel (FR); Lucien Henri Jacques Quennehen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/296,467

(22) PCT Filed: Dec. 18, 2019

(86) PCT No.: PCT/FR2019/053173
§ 371 (c)(1),
(2) Date: May 24, 2021

(87) PCT Pub. No.: WO2020/128338
PCT Pub. Date: Jun. 25, 2020

(65) Prior Publication Data
US 2021/0396153 A1 Dec. 23, 2021

(30) Foreign Application Priority Data
Dec. 19, 2018 (FR) .................................... 1873404

(51) Int. Cl.
*F01D 11/08* (2006.01)
*F01D 25/24* (2006.01)
*F01D 25/00* (2006.01)

(52) U.S. Cl.
CPC ............ *F01D 25/246* (2013.01); *F01D 11/08* (2013.01); *F01D 25/005* (2013.01);
(Continued)

(58) Field of Classification Search
CPC .......... F01D 11/00; F01D 11/08; F01D 25/24; F01D 25/243; F01D 25/246; F01D 9/04; F05D 2240/11; F05D 2300/6033
See application file for complete search history.

(56) References Cited

U.S. PATENT DOCUMENTS

2012/0027572 A1  2/2012  Denece et al.
2012/0082540 A1  4/2012  Dziech et al.
(Continued)

FOREIGN PATENT DOCUMENTS

EP   1 350 927 A2   10/2003
FR   2 540 939 A1    8/1984
(Continued)

OTHER PUBLICATIONS

International Search Report as issued in International Patent Application No. PCT/FR2019/053173, dated Jul. 8, 2020.

*Primary Examiner* — David E Sosnowski
*Assistant Examiner* — Maxime M Adjagbe
(74) *Attorney, Agent, or Firm* — Pillsbury Winthrop Shaw Pittman LLP (57) ABSTRACT

A turbine ring assembly includes ring segments forming a turbine ring and a ring support structure, each segment having a part forming an annular base with, in the radial direction, an inner face and an outer face from which project a first and a second hooking tab, the structure including a shroud from which project a first and a second radial flange between which are retained the first and second tabs, a first annular flange made of one part and a second annular flange disposed upstream of the ring. The first flange includes an (Continued)

annular shoulder and the second flange includes an annular recess forming an axial stop cooperating with the shoulder.

16 Claims, 7 Drawing Sheets

(52) U.S. Cl.
CPC ........ *F01D 25/243* (2013.01); *F05D 2240/11* (2013.01); *F05D 2240/55* (2013.01); *F05D 2250/141* (2013.01); *F05D 2260/31* (2013.01); *F05D 2260/36* (2013.01); *F05D 2300/6033* (2013.01)

(56) References Cited

U.S. PATENT DOCUMENTS

| | | | |
|---|---|---|---|
| 2014/0271145 | A1 | 9/2014 | Thomas et al. |
| 2017/0016341 | A1* | 1/2017 | Stapleton ................ F01D 9/042 |
| 2018/0051590 | A1* | 2/2018 | Tableau .................. F01D 11/08 |
| 2018/0051591 | A1* | 2/2018 | Quennehen ........... F01D 11/005 |
| 2018/0087401 | A1* | 3/2018 | Quennehen ............. F01D 11/08 |
| 2018/0156068 | A1* | 6/2018 | Roussille ................ F01D 25/24 |

FOREIGN PATENT DOCUMENTS

| | | |
|---|---|---|
| FR | 2 955 898 A1 | 8/2011 |
| FR | 3 055 146 A1 | 2/2018 |
| FR | 3 055 147 A1 | 2/2018 |
| GB | 2 480 766 A | 11/2011 |
| WO | WO 2006/136755 A2 | 12/2006 |
| WO | WO 2018/172654 A1 | 9/2018 |

* cited by examiner

TURBINE RING ASSEMBLY HAVING INDEXED FLANGES

CROSS-REFERENCE TO RELATED APPLICATIONS

This application is the U.S. National Stage of PCT/FR2019/053173, filed Dec. 18, 2019, which in turn claims priority to French patent application number 1873404 filed Dec. 19, 2018. The content of these applications are incorporated herein by reference in their entireties.

TECHNICAL FIELD

The invention relates to a turbine ring assembly comprising a plurality of ring segments made of ceramic matrix composite material as well as a ring support structure, and specifically a method for dismantling a turbine ring assembly.

PRIOR ART

The field of application of the invention is in particular that of aeronautical gas turbine engines. The invention is however applicable to other turbomachines, for example industrial turbines.

In the case of fully metallic turbine ring assemblies, it is necessary to cool all the elements of the assembly and particularly the turbine ring which is subjected to the hottest flows. This cooling has a significant impact on the engine performance since the cooling flow used is bled from the main engine flow. Furthermore, the use of metal for the turbine ring limits the possibility of increasing the temperature at the turbine, even though this would make it possible to improve the performance of aeronautical engines.

To attempt to solve these problems, it has been envisioned to produce turbine ring segments made of ceramic matrix composite (CMC) material in order to dispense with the use of a metallic material.

CMC materials have good mechanical properties making them able to form structural parts and advantageously keep these properties at high temperatures. The use of CMC materials has advantageously made it possible to reduce the cooling flow required during operation and therefore to increase the performance of turbomachines. Furthermore, the use of CMC materials advantageously makes it possible to reduce the weight of turbomachines and reduce the effect of hot expansion encountered with metallic parts.

However, the existing solutions proposed can employ an assembly of a CMC ring segment with metallic hooking parts of a ring support structure, these hooking parts being subject to the hot flow. Consequently, these metallic hooking parts undergo hot expansions, which can lead to the mechanical stressing of the CMC ring segments and to their embrittlement.

Also known are the documents FR 2 540 939, GB 2 480 766, EP 1 350 927, US 2014/0271145, US 2012/082540 and FR 2 955 898 which disclose turbine ring assemblies.

A need exists to improve existing turbine ring assemblies and their installation, and in particular existing turbine ring assemblies employing a CMC material in order to reduce the intensity of the mechanical stresses to which the CMC ring segments are subjected during the operation of the turbine.

Furthermore, CMC rings cannot withstand shrink-fitted assemblies.

SUBJECT OF THE INVENTION

The aim of the invention is to propose a turbine ring assembly allowing the retaining of each ring segment deterministically, i.e. in such a way as to control its position and avoid it starting to vibrate, on the one hand, while allowing the ring segment, and by extension the ring, to distort under the effects of rises in temperature and variations in pressure, and this, in particular, independently of the metallic parts at the interface, and, on the other hand, while improving the sealing between the segment outside the flow path and the segment in the flow path, in particular the sealing of the cavity located at the radially upper part of the ring. All this is achieved while simplifying the manipulations and reducing the number of manipulations for the installation of the ring assembly.

Another aim of the invention is to propose a turbine ring assembly provided with an upstream flange making it possible, on the one hand, to ensure the optimal sealing of the cavity defined by the ring, and, on the other hand, to efficiently accommodate the different axial lengths of each CMC ring segment composing the ring crown. In other words for this second point, the rectilinear contact between the upstream part of the ring and the tab of the upstream flange must be effective for each ring segment, although these have different widths, these widths being specifically affected by the manufacturing tolerances.

One subject of the invention proposes a turbine ring assembly comprising a plurality of ring segments made of ceramic matrix composite material forming a turbine ring and a ring support structure, each ring segment having, along a section plane defined by an axial direction and a radial direction of the turbine ring, a part forming an annular base with, in the radial direction of the turbine ring, a radially inner face defining the inner face of the turbine ring and a radially outer face from which project a first and a second hooking tab, the ring support structure including:

- a central shroud from which project a first and a second radial flange from which are retained the first and second hooking tabs of each ring segment,
- a first annular flange made of one part disposed upstream of the turbine ring and upstream of the first radial flange with respect to the direction of an air flow intended to traverse the turbine ring assembly, and having in the radial direction a first free end, a second end opposite the first end, and
- a second annular flange disposed upstream of the first flange and having a first free end, a second end opposite the first end, an upstream face and a downstream face both extending in the radial direction, the second ends of the first and second flanges being removably attached to said first radial flange.

According to a general feature of the subject, the first flange comprises a shoulder projecting in the axial direction upstream from the second end of the first flange, and the second flange comprises an annular recess on the corner formed at the junction between the second end and the downstream face of the second flange, said recess forming an axial stop configured to cooperate by interlocking with said shoulder in the axial direction.

The double shoulder provided between the two annular flanges and formed by the shoulder of the first annular flange and the recess of the second annular flange makes it possible to limit the problems of thermal ramps between the two metallic annular flanges.

The greater the length over which the shoulder of the first annular flange and the recess of the second annular flange cooperate, i.e. are in contact, the better the sealing and the quality of the contact between the shoulder and the recess. The length of cooperation is measured in the circumferential direction. To guarantee a contact at the worst-case tolerance, the length over which the shoulder and the recess cooperate is at least 1 mm.

According to a first aspect of the turbine ring assembly, the first flange further comprises a first portion extending from the first end, and a second portion extending between the first portion and the second end, the first portion of the first flange bearing against the first hooking tab of the turbine ring. The second portion of the first flange is attached to the first radial flange of the central shroud of the ring support structure. The first portion of the first annular flange comprises a plurality of radial slots opening onto the first end of the first annular flange delimiting segments of the first portion of the first annular flange.

The slots extend solely into the first portion of the first flange, not into the second portion. Said segments of the first portion extend in a circumferential direction of the turbine ring.

Incorporating a first fully segmented upstream annular flange would allow each segment of the segmented upstream flange to adapt to the width of the CMC ring facing it, i.e. to the axial length of each ring segment. In this way axial leaks, particularly at the rectilinear supports, between the ring and the first upstream flange, are removed. However, such a solution would cause considerable leaks at the segments between each segmented flange. This would be the case even if devices such as sealing tabs are installed to attenuate these leaks toward the outer cavities of the ring.

Directly incorporating a first annular flange made of single, in other words non-segmented, part would make it possible to provide axial sealing between the segmented CMC ring and the annular casing, particularly by avoiding inter-segment leaks with by comparison with the case in which a first upstream flange is segmented. However, the continuity of the upstream first annular flange, particularly at the rectilinear supports facing the ring segments which do not all have the same width (because of the manufacturing tolerances) would cause considerable leaks at the rectilinear supports. The first annular flange would not be sufficiently accommodating of ring segments that have different widths.

The first portion of the first annular flange according to the invention thus makes it possible, by virtue of its unsegmented annular shape, to provide axial sealing between the segmented CMC turbine ring and the annular casing. And the segmentation of the second portion of the first annular flange according to the invention makes it possible to accommodate each sector of the second portion of the first annular flange with a turbine ring segment facing it. In this way, the leak at the axial supports of the CMC turbine ring is removed.

The ring turbine assembly thus provided with a semi-segmented first annular flange thus makes it possible to overall reduce leaks between the cavity of the turbine ring and the outside.

Preferably, the second portion of the first flange is removably attached to the first radial flange of the central shroud of the ring support structure.

According to a second aspect of the turbine assembly, the first flange further comprises an inter-segment seal for each radial slot of the first annular flange, each radial slot having a first and a second surface parallel in the radial direction and in the axial direction, the first surface of a radial slot comprising a first groove and the second surface comprising a second groove extending facing the first groove symmetrically with the first groove with respect to a plane extending in the axial direction and in the radial direction along the radial slot, a first portion of the inter-segment seal being inserted into the first groove and a second portion of the inter-segment seal being inserted into the second groove.

The inter-segment seals, or sealing tabs, inserted into the radial slots make it possible to reduce the leaks at the cavity of the ring.

According to a third aspect of the turbine ring assembly, the first annular flange may comprise, for each radial slot, a discharge orifice, and each radial slot opens on the one hand onto the first end of the first annular flange and on the other hand into the discharge orifice.

In other words, each radial slot may comprise a first end open at the first end of the first annular flange and a second end opposite said first end of the radial slot and open onto the discharge orifice.

The transition between the second segmented portion and the first annular portion of the first flange is subsequently referred to as the channel bottom. The channel bottom forms the locus of tangential stress concentrations when the first semi-segmented annular flange is subject to a radial temperature gradient. These tangential stress concentrations on the channel bottom may initiate cracks and thus reduce the lifetime of the first annular flange.

The discharge orifices make it possible to significantly reduce the stress concentrations by diffusing the stresses around the discharge orifice.

According to a fourth aspect of the turbine assembly, the discharge orifices can be circular orifices having a diameter between 0.1 mm and 8 mm and preferably between 1 mm and 5 mm.

Figure 1:
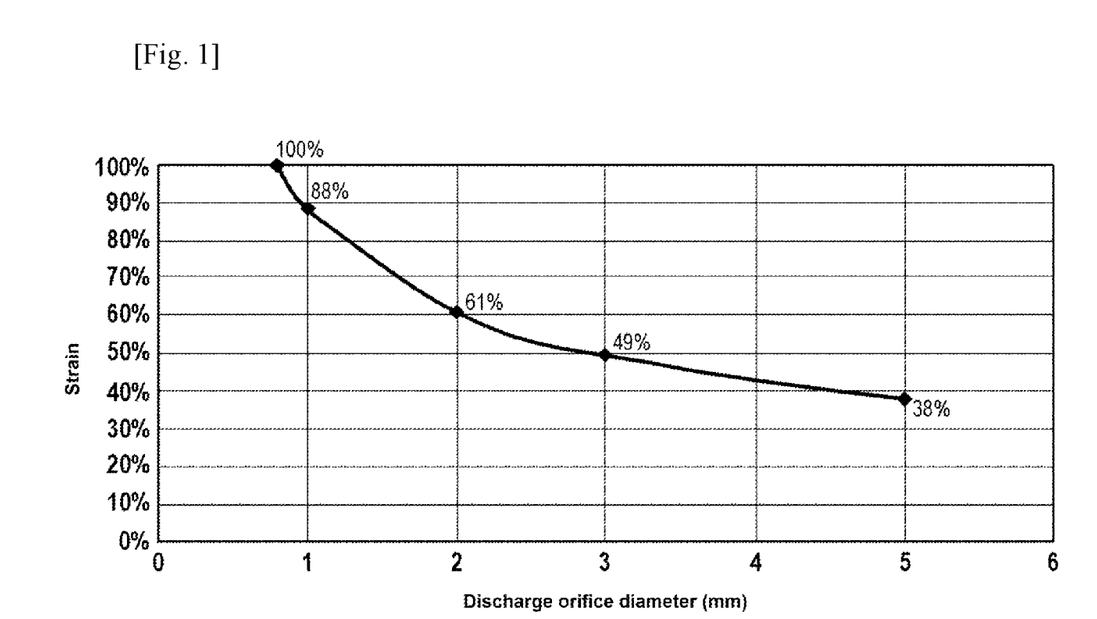
FIG. 1, already shown, shows a graph of the variation of the maximum strain exerted on the first annular flange as a function of the diameter of the discharge orifice.

The diameter of the circular discharge orifice plays a key role in lowering the stresses, as shown by the graph of FIG. 1 representing the variation in the strain rate as a function of the diameter of the discharge orifice, the ratio being determined with respect to a first annular flange upstream with no discharge orifice. On this graph, it can be seen that the addition of a discharge hole of up to 5 mm in diameter makes it possible to lower the maximum strain level by 62%. The addition of these discharge orifices therefore makes it possible to ensure the structural integrity of the first annular flange when it is subject to a radial temperature gradient.

In a variant, the discharge orifices can be radial oblong orifices, i.e. orifices having an oblong shape having a length extending in the radial direction and a width in a direction orthogonal to the radial direction, the length being greater than the width of the oblong orifice.

In another variant, the discharge orifices can be tangential oblong orifices, i.e. orifices of oblong shape having a width extending in the radial direction and a length in a direction orthogonal to the radial direction, in other words a width extending in a tangential direction, the length being greater than the width of the oblong orifice.

According to a fifth aspect of the turbine ring assembly, the first flange may comprise, for each radial slot, a notch made in the shoulder, the notch extending in a plane comprising a circumferential direction of the ring and the axial direction and intersecting a plane comprising the axial direction and the radial direction and traversing the radial slot.

In other words, each notch is facing a radial slot of the first annular flange. Each notch provided in the first annular flange makes it possible, when the second annular flange is taken in isolation, i.e. dismantled, to run an electrode through to facilitate the formation of the grooves in the first and second surfaces of the slot for the insertion of a sealing tab.

According to a sixth aspect of the turbine ring assembly, the annular recess of the second flange is segmented in the circumferential direction into a plurality of recess segments, two adjacent recess segments being separated by a radial centering dog forming a stop in a circumferential direction of the ring and shaped to cooperate with a notch of the first flange in the circumferential direction, each radial dog, extending from the recess projecting in the radial direction and in the axial direction downstream.

The radial centering dog makes it possible to index the second annular flange with respect to the first annular flange during the installation of the ring assembly. Thus, instead of indexing the annular flanges using two pins per flange segment, which requires a clearance between the flanges and the pins, the indexing can be done using radial centering dogs which makes it possible, on the other hand, to reduce the number of parts and to limit the number of drill holes in the flanges, the drill holes being a possible source of leaks, and, on the other hand, to improve the accuracy of the indexing.

The second annular flange preferably comprises at least two radial centering dogs each intended to cooperate with a notch of the first annular flange.

According to a seventh aspect of the turbine ring assembly, each notch comprises, in a plane comprising the circumferential direction and the axial direction of the ring, two parallel side walls extending along the axial direction and a bottom wall extending along the circumferential direction between the two side walls, the side walls of the notch being each connected to the bottom wall in a way that makes an arc.

Preferably, the connecting arcs each have a radius of curvature greater than or equal to 1.5 mm.

The connecting arcs having radii of at least 1.5 mm make it possible to avoid concentrations of stresses between the radial dogs and the notches.

According to an eighth aspect of the turbine ring assembly, the first end of the second annular flange is distant from the first end of the first annular flange in the axial direction.

The second annular flange separate from the first annular flange at the level of its free end makes it possible to supply to the ring turbine assembly an upstream flange dedicated to taking up the force of the high-pressure nozzle guide vane (HP NGV). The second annular flange upstream of the turbine ring is free of all contact with the ring and is configured to route as much as possible of the axial force induced by the HP NGV directly into the ring support structure without passing through the ring which has, when it is made of CMC, a low allowable mechanical constraint.

Specifically, leaving a space between the first ends of the first and second annular flanges makes it possible to deviate the force received by the second flange, upstream of the first annular flange which is in contact with the turbine ring, and to route it directly toward the central shroud of the ring support structure via the second end of the second annular flange, without affecting the first annular flange and therefore without affecting the turbine ring. Since the first end of the first flange does not undergo any force, the turbine ring is thus preserved from this axial force.

The routing of the HP NGV force via the second annular flange can cause it to tip. This tipping can incur an uncontrolled contact between the bottom parts, i.e. the first ends of the second annular flange and of the first annular flange in contact with the turbine ring, which would have the consequence of directly transmitting the HP NGV force to the ring.

In a variant, the second end of the first flange and the second end of the second flange can be separated by a contact stop. The contact stop proposed between the second ends of the first and second annular flange makes it possible to avoid contact between the bottom part of the second annular flange, disposed upstream of the first flange, and that of the first annular flange following this tipping. The direct routing of the HP NGV force toward the ring is thus avoided.

Furthermore, the removable nature of the annular flanges makes it possible to have axial access to the cavity of the turbine ring. This makes it possible to assemble the ring segments together outside the ring support structure and then to axially slide the assembly thus assembled into the cavity of the ring support structure until it is bearing against the second radial flange, before attaching the annular flange to the central shroud of the ring support structure.

During the operation of attaching the turbine ring to the ring support structure, it is possible to use a tool including a cylinder or a ring on which the ring segments are pressed or suction-fastened while they are assembled into the crown.

The solution defined above for the ring assembly thus makes it possible to retain each ring segment deterministically, i.e. to control its position and avoid it starting to vibrate, while improving the sealing between the segment outside the flow path and the segment on the flow path, while simplifying the manipulations and reducing the number of manipulations for the installation of the ring assembly, and allowing the ring to distort under the effects of temperature and pressure, particularly independently of the metallic interface parts.

According to a ninth aspect of the turbine ring assembly, the first flange can have a thickness in the axial direction less than the thickness in the axial direction of the second flange.

The thinness of the second end of the first annular flange offers flexibility to the upstream part of the support structure intended to be in contact with the ring.

According to a tenth aspect of the turbine ring assembly, the second radial flange of the ring support structure has a first free end and a second end forming a single part with the central shroud of the ring support structure, the first end of the second radial flange being in contact with the second hooking tab of the turbine ring and having a thickness in the axial direction greater than the thickness of the first end of the first annular flange.

The control of the stiffness at the axial contacts of the ring support structure with the ring ensures the retainment of the seal under all circumstances, without however incurring excessively high axial forces on the ring. The increased thickness of the downstream part of the ring support structure, in particular the first end of the second radial flange, the free end, makes it possible to offer greater stiffness to the downstream part of the ring support structure with respect to its upstream part comprising the first annular radial flange and the first and second annular flanges. These increased stiffness makes it possible to reduce the axial leaks downstream between the ring and the casing, i.e. the ring support structure, in the case of a rectilinear support.

According to an eleventh aspect of the turbine ring assembly, the ring segment can have a section shaped like the inverted Greek letter pi ($\pi$) along the section plane defined by the axial direction and the radial direction, and the assembly may comprise, for each ring segment, at least three pins to radially retain the ring segment in position, the first and second hooking tabs of each ring segment each comprising a first end forming a single part with the outer face of the annular base, a second free end, at least three lugs for receiving said at least three pins, at least two lugs projecting from the second end of one of the first or second hooking tabs in the radial direction of the turbine ring and at least one lug projecting from the second end of the other hooking tab in the radial direction of the turbine ring, each receiving lug including an orifice for receiving one of the pins.

According to a twelfth aspect of the turbine ring assembly, the ring segment can have a section shaped like an elongated K along the section plane defined by the axial direction and the radial direction, the first and second hooking tabs having the shape of an S.

According to a thirteenth aspect of the turbine ring assembly, the ring segment can have, over at least one radial interval of the ring segment, a section in the shape of an O along the section plane defined by the axial direction and the radial direction, the first and second hooking tabs each having a first end forming a single part with the outer face and a second free end, and each ring segment comprising a third and a fourth hooking tab each extending, in the axial direction of the turbine ring, between a second end of the first hooking tab and a second end of the second hooking tab, each ring segment being attached to the ring support structure by an attaching screw including a screw head bearing against the ring support structure and a thread cooperating with a tapped hole made in an attaching plate, the attaching plate cooperating with the third and fourth hooking tabs. The ring segment further comprises radial pins extending between the central shroud and the third and fourth hooking tabs.

Another subject of the invention proposes a turbomachine comprising a turbine ring assembly as defined above.

BRIEF DESCRIPTION OF THE DRAWINGS

The invention will be better understood on reading the text below, illustrative but without limitation, with reference to the appended drawings wherein.

DESCRIPTION OF THE EMBODIMENTS

Figure 2:
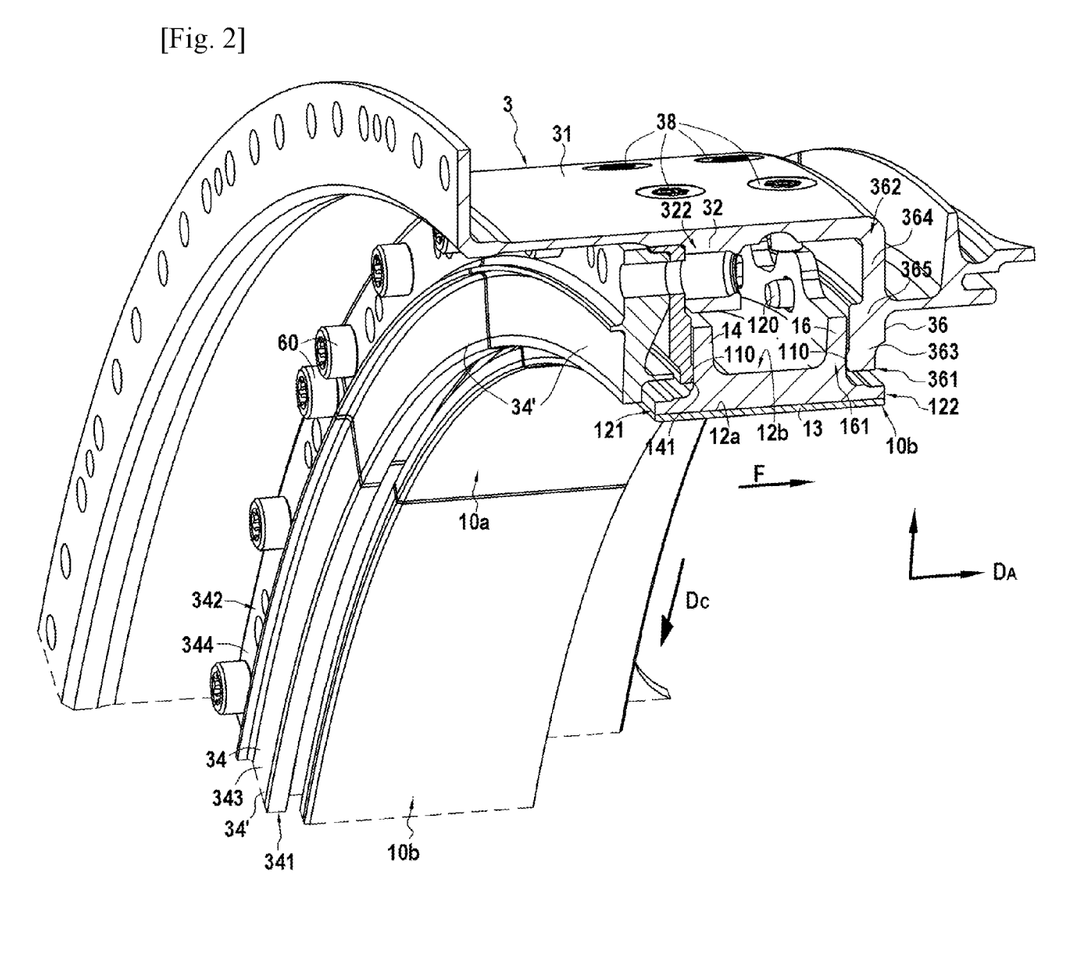
FIG. 2 is a schematic perspective view of a first embodiment of a ring turbine assembly according to the invention.

FIG. 2 shows a high-pressure turbine ring assembly comprising a turbine ring 1 made of ceramic matrix composite material (CMC) and a metallic ring support structure 3. The turbine ring 1 surrounds a set of rotary blades (not represented). The turbine ring 1 is formed of a plurality of ring segments 10, FIG. 2 being a radial section view. The arrow $D_A$ indicates the axial direction of the turbine ring 1 while the arrow $D_R$ indicates the radial direction of the turbine ring 1 and the arrow $D_C$ indicates the circumferential direction of the turbine ring 1. For the sake of simplicity of depiction, FIG. 1 is a partial view of the turbine ring 1 which is in reality a full ring.

Figure 3:
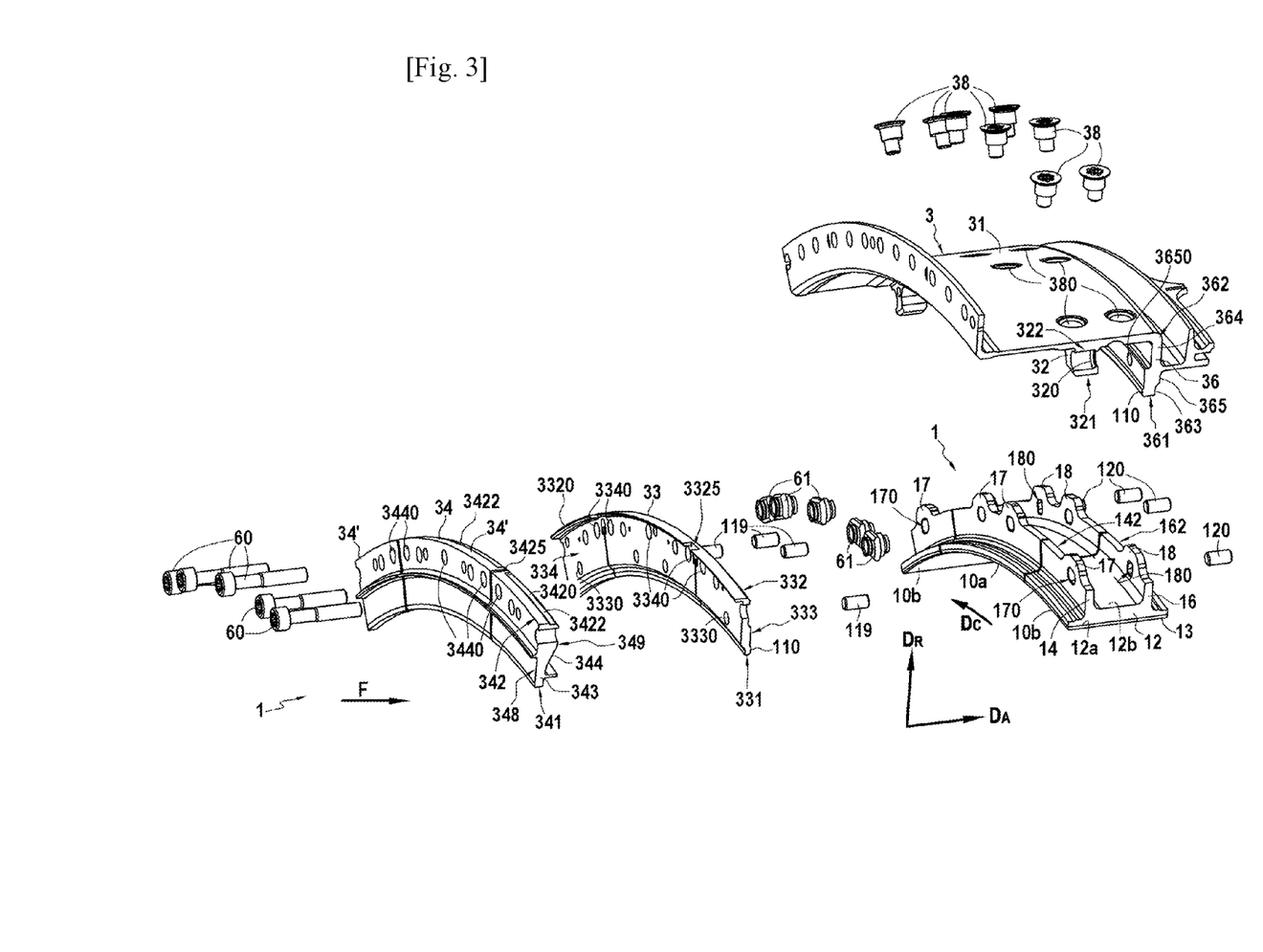
FIG. 3 is a schematic exploded perspective view of the ring turbine assembly of FIG. 2.
Figure 4:
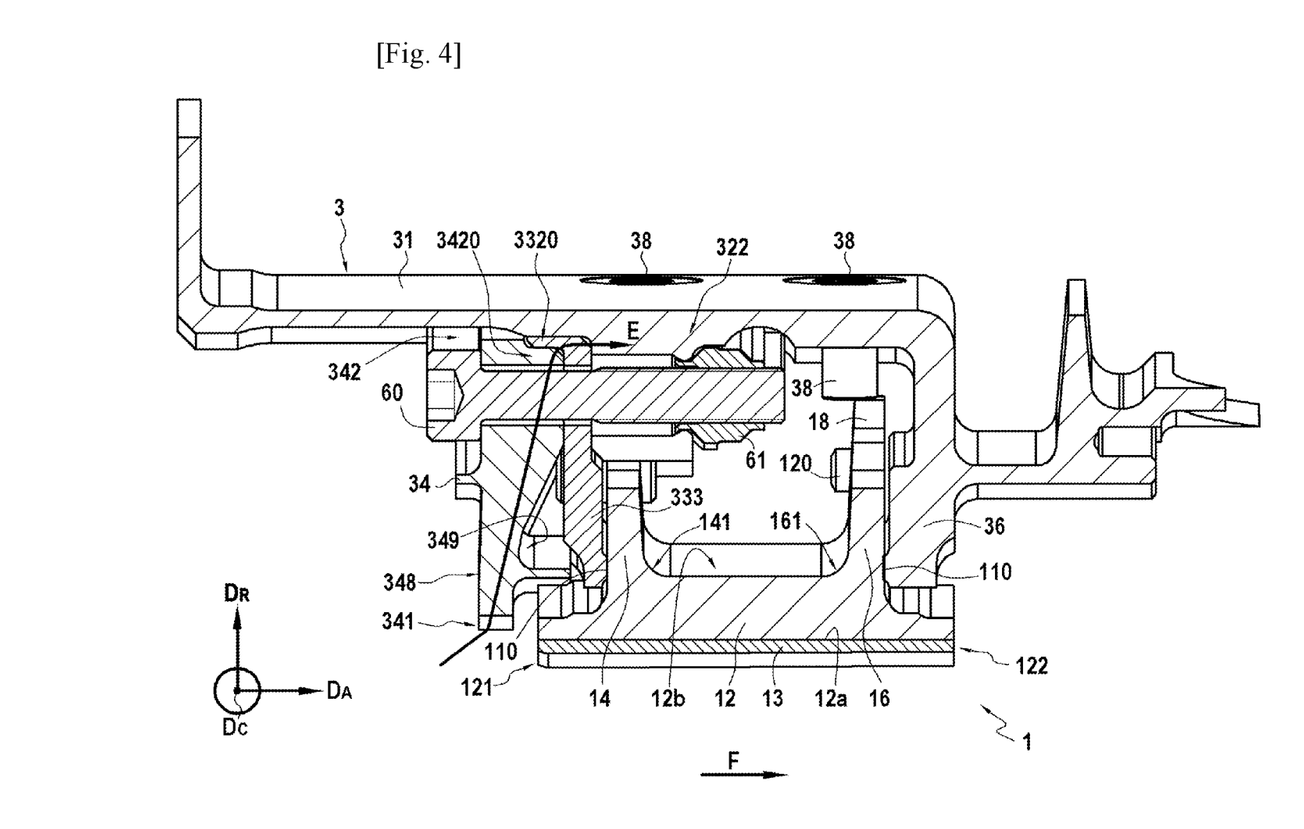
FIG. 4 is a schematic section view of the ring turbine assembly of FIG. 2.

As illustrated in FIGS. 3 and 4 which respectively show a schematic view in exploded perspective and a section view of the turbine ring assembly of FIG. 2, the section view being along a section plane comprising the radial direction $D_R$ and the axial direction $D_A$ and orthogonal to the circumferential direction $D_C$, each ring segment 10 has, along a plane defined by the axial $D_A$ and radial $D_R$ directions, a section substantially in the shape of an inverted Greek letter π. The section specifically comprises an annular base 12 and upstream and downstream radial hooking tabs, respectively 14 and 16. The terms "upstream" and "downstream" are here used with reference to the direction of flow of the gas flow in the turbine represented by the arrow F in FIG. 1. The tabs of the ring segment 10 could have another shape if the section of the ring segment has another shape than π, such as for example a K or O shape.

The annular base 12 includes, along the radial direction $D_R$ of the ring 1, an inner face 12a and an outer face 12b opposite one another. The inner face 12a of the annular base 12 is coated with a layer 13 of abradable material to define a path for gas flows in the turbine. The terms "inner" and "outer" user are used here with reference to the radial direction $D_R$ in the turbine.

The upstream and downstream radial hooking tabs 14 and 16 project, along the direction $D_R$, from the outer face 12b of the annular base 12 at a distance from the upstream and downstream ends 121 and 122 of the annular base 12. The upstream and downstream 14 and 16 radial hooking tabs extend over the entire width of the ring segment 10, i.e. over the whole arc of a circle described by the ring segment 10, or else over the entire circumferential length of the ring segment 10.

In FIGS. 2 and 3 the portion of turbine ring 1 represented comprises a complete ring segment 10 surrounded by two half ring segments 10. For a better understanding, the full ring segment is referenced 10a and the half ring segments are referenced 10b in FIG. 3.

As illustrated in FIGS. 2 to 4, the ring support structure 3 forming a single part with a turbine casing comprises a central shroud 31, extending in the axial direction $D_A$, and having an axis of revolution colinear with the axis of revolution of the turbine ring 1 when they are attached together, as well as a first annular radial flange 32 and a second annular radial flange 36, the first annular radial flange 32 being positioned upstream of the second annular radial flange 36 which is therefore located downstream of the first annular radial flange 32.

The second annular radial flange 36 extends in the circumferential direction $D_C$ of the ring 1 and, along the radial direction $D_R$, from the central shroud 31 toward the center of the ring 1. It comprises a first free end 361 and a second free end 362 forming a single part with the central shroud 31. The second annular radial flange 36 includes a first portion 363, a second portion 364, and a third portion 365 contained between the first portion 363 and the second portion 364. The first portion 363 extends between the first end 361 and the third portion 365, and the second portion 364 extends between the third portion 365 and the second end 362. The first portion 363 of the second annular radial flange 36 is in contact with the downstream radial hooking tab 16. The first portion 363 and the third portion 365 have an increased thickness compared to that of the second portion 364 to offer an increased stiffness to the second radial flange with respect to the upstream part, including in particular the first radial flange 32, in such a way as to reduce the axial leaks of the ring in the case of a rectilinear bearing.

The first annular radial flange 32 extends in the circumferential direction $D_C$ of the ring 1 and, along the radial direction $D_R$, from the central shroud 31 toward the center of the ring 1. It comprises a first free and 321 and a second free end 322 forming a single part with the central shroud 31.

As illustrated in FIGS. 1 to 3, the turbine ring assembly 1 comprises a first annular flange 33 and a second annular flange 34, the two annular flanges 33 and 34 being removably attached to the first annular radial flange 32. The first and second annular flanges 33 and 34 are disposed upstream of the turbine ring 1 with respect to the direction F of flow of the gas flow in the turbine.

The first annular flange 33 is disposed downstream of the second annular flange 34. The first annular flange 33 is made of a single part while the second annular flange 34 can be segmented into a plurality of annular segments 34' of the second flange 34 or be made of a single part.

The first annular flange 33 has a free first end 331 and a second end 332 removably attached to the ring support structure 3, and more specifically to the first annular radial flange 32. Furthermore, the first annular flange 33 has a first portion 333 and a second portion 334, the first portion 333 extending between the first end 331 and the second portion 334, and the second portion 334 extending between the first portion 333 and the second end 332.

The second annular flange 34 has a first free end 341 and a second end 342 opposite the first end 341 and in contact with the central crown 31. The second end 342 of the second annular flange 34 is also removably attached to the ring support structure 3, and more specifically to the first annular radial flange 32. The second annular flange 34 further comprises a first portion 343 and a second portion 344, the first portion 343 extending between the first end 341 and the second portion 344, and the second portion 344 extending between the first portion 343 and the second end 342. The second annular flange 34 also comprises an upstream face 348 and a downstream face 349 opposite the upstream face 348, the upstream and downstream faces 348 and 349 each extending in planes comprising the radial direction $D_R$ and the circumferential direction $D_C$ of the ring 1.

When the ring assembly 1 is installed, the first portion 333 of the first annular flange 33 is bearing against the upstream radial hooking tab 14 of each of the ring segments 10 composing the turbine ring 1, and the second portion 334 of the first annular flange 34 is bearing against at least one part of the first annular radial flange 32.

The first and second upstream annular flanges 33 and 34 are shaped to have the first portions 333 and 343 distant from one another and the second portions 334 and 344 in contact, the two flanges 33 and 34 being removably attached to the upstream annular radial flange 32 using attaching screws 60 and nuts 61, the screws 60 traversing orifices 3340, 3440 and 320 respectively provided in the second portions 334 and 344 of the two annular flanges 33 and 34 as well as in the upstream annular radial flange 32.

The second annular flange 34 is dedicated to taking up the force of the High-Pressure Nozzle Guide Vane (HP NGV) on the ring assembly 1 by routing this force toward the casing line which is more mechanically robust, i.e. toward the line of the ring support structure 3 as illustrated by the force arrows E shown in FIG. 4. The residual force, which passes through the first annular flange 33 is reduced since the first portion 333 of the first upstream flange 33 has a reduced, and thus more flexible, section, which makes it possible to apply a minimum of force to the CMC ring 1.

Figure 5:
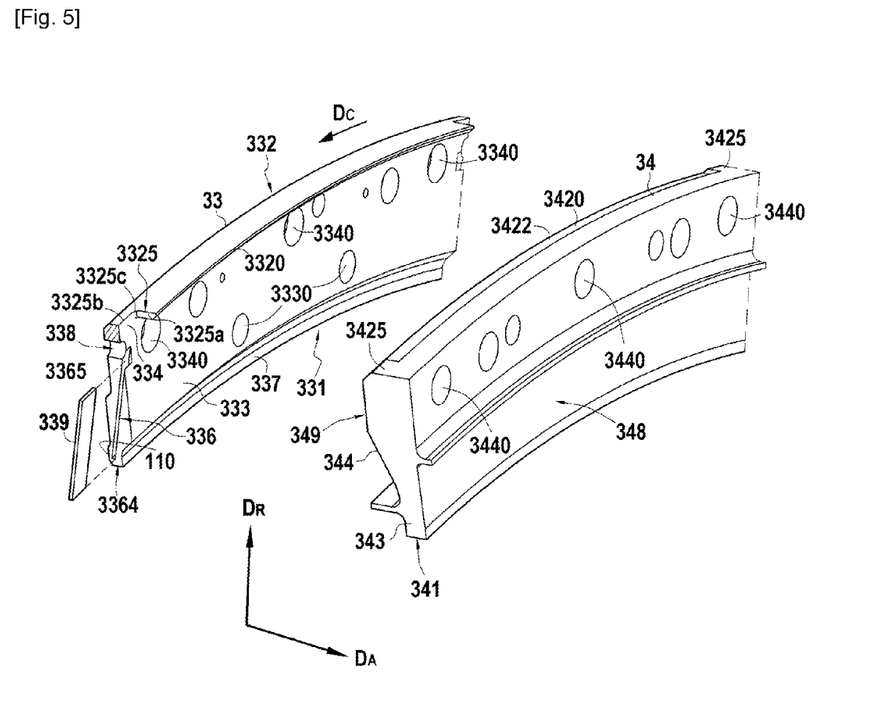
FIG. 5 is a schematic section view of the upstream first annular flange of FIG. 2 along the section plane V-V.

FIG. 5 illustrates a schematic section view of the upstream first annular flange of FIG. 2 along a section plane comprising the radial direction $D_R$ and the axial direction $D_A$ and traversing a radial slot 336 of the first annular flange 33.

As illustrated in FIG. 5, the first portion 333 of the first annular flange 33 has a plurality of radial slots 336 extending from the first end 331. The radial slots 336 have a first end 3361 and a second end 3362 opposite the first end 3361, the first end 3361 being more inward than the second end 3362 in the radial direction $D_R$. The first ends 3361 of the radial slots 36 are open onto the first end 331 of the first annular flange 33. Each radial slot 336 has a first and a second surface 3364 parallel in the radial direction $D_R$ and in the axial direction $D_A$, the distance between the first and the second surface 3364, which corresponds to the tangential thickness of the channels, can be between 0.1 mm and 1 mm. The radial length of the slots can be between 10 and 90% of the full radial length of the upstream flange. A small radial slot length promotes the reduction of leaks but degrades the capacity of accommodation of the flange segments with regard to the ring segments. A long radial slot length promotes the accommodation of the sections of the flange with regard to the ring segments but increases the amount of leaks.

Each pair of adjacent radial slots 336 thus delimits, between the two adjacent radial slots 336, a segment of the first portion 337 of the first annular flange 33. Each segment of the first portion 337 has the shape of a ring segment, i.e. a solid formed by two concentric arcs of a circle and different radii and two straight line segments each corresponding to a segment of the radius of the large arc of a circle contained between the small arc of a circle and the large arc of a circle. Each segment of the first portion 337 is independent of the other segments of the first portion 337 given that the radial slots 36 are open at their first end 3361.

The first annular flange 33 further comprises discharge orifices 338, and specifically one discharge orifice 338 per radial slot 336. Each discharge orifice 338 communicates with the second end 3362 of a radial slot 36. In other words, each discharge orifice 338 is made in the first annular flange 33 at the second end 3362 of a radial slot such that the second end 3362 of a radial slot is open onto the corresponding discharge orifice 338.

In the first embodiment illustrated in FIGS. 2 to 5, the discharge orifices 338 are circular orifices having a diameter between 1 mm and 5 mm.

As illustrated in FIG. 5, the first annular flange 33 further comprises one inter-segment seal 339 for each radial slot 336.

Each radial slot 336 has a first and a second surface 3364 on either side of the radial slot 336. Since FIG. 5 is a section made through a radial slot 336, only one surface 3364 of the radial slot 336 is represented. The first and second surfaces 3364 of a radial slot 336 are parallel, i.e. they are disposed facing one another over the entire radial length of the radial slot 336.

The first surface 3364 comprises a first groove 3365 mainly extending in the radial direction $D_R$. Similarly, the second surface comprises a second groove mainly extending in the radial direction $D_R$. The second groove extends facing the first groove 3365 symmetrically with the first groove 3365 with respect to the section plane VI-VI.

The first and second grooves 3365 of a radial slot 336 are shaped to receive the inter-segment seal 339 or sealing ring. The inter-segment seal thus makes it possible to provide sealing between the segments of the first portion 333 of the first annular flange 33.

Furthermore, as illustrated in FIGS. 2 to 5, the first flange 33 comprises an annular shoulder 3320 projecting in the axial direction $D_A$ upstream from the second end 332 of the first flange 33, as well as, for each radial slot 336 of the first flange 33, a notch 3325 made in the shoulder 3320. Each notch 3325 extends in a plane comprising the circumferential direction $D_C$ and the axial direction $D_A$ of the ring and intersecting a plane comprising the axial direction $D_A$ and the radial direction $D_R$ and traversing the radial slot 336.

The second flange 34 comprises an annular recess 3420 corresponding to an additional annular shoulder 3320 of the first flange 33. In other words, the annular recess 3420 forms an axial stop configured to cooperate with said shoulder 3320 in the axial direction $D_A$.

The annular recess 3420 of the second flange 34 is made on the corner formed at the junction between the second end 342 and the downstream flange 349 of the second flange 34 from a plurality of recess segments 3422, the segments being successively aligned in the circumferential direction $D_C$ to form the annular recess 3420.

The second flange 34 comprises a plurality of radial centering dogs 3425 extending from the recess 3420 projecting in the radial direction $D_R$ and in the axial direction $D_A$ downstream. In the embodiment illustrated in FIGS. 2 to 5, the second flange 34 comprises as many radial centering dogs 3425 as the first flange 33 comprises notches 3320.

Two adjacent recess segments 3422 of the second flange 34 are separated by a radial centering dog 3425. Each radial centering dog 3425 forms a stop in a circumferential direction $D_C$ of the ring and is shaped to cooperate with a notch 3325 of the first flange 33 in the circumferential direction $D_C$.

Each notch 3325 comprises, in a plane comprising the circumferential direction $D_C$ and the axial direction $D_A$ of the ring, two parallel side walls 3325a extending along the axial direction $D_A$ and a bottom wall 3325b extending along the circumferential direction $D_C$ between the two side walls 3325a. The side walls 3325a of one the notch 3325 are each connected to the bottom wall 3325b in a way that makes an arc 3325c having a radius of curvature greater than or equal to 1.5 mm.

In the axial direction $D_A$, the downstream annular radial flange 36 of the ring support structure 3 is separate from the upstream first annular flange 33 by a distance corresponding to the separation of the upstream and downstream radial hooking tabs 14 and 16 in such a way as to retain these latters between the downstream annular radial flange 36 and the first upstream flange 33.

To retain the ring segments 10, and therefore the turbine ring 1, in position with the ring support structure 3, the ring assembly comprises, for each ring segment 10, two first pins 119 cooperating with the upstream hooking tab 14 and the first annular flange 33, and two second pins 120 cooperating with the downstream hooking tab 16 and the second annular radial flange 36.

For each corresponding ring segment 10, the first portion 333 of the first annular flange 33 comprises two orifices 3330 for receiving the two first pins 119, and the third portion 365 of the annular radial flange 36 comprises two orifices 3650 configured to receive the two second pins 120.

For each ring segment 10, each of the upstream and downstream radial hooking tabs 14 and 16 comprises a first end, 141 and 161, forming a single part with the outer face 12b of the annular base 12 and a second end, 142 and 162, free. The second end 142 of the upstream hooking tab 14 comprises two first lugs 17 each including an orifice 170 configured to receive a first pin 119. Similarly, the second end 162 of the downstream radial hooking tab 16 comprises two second lugs 18 each including an orifice 180 configured to receive a second pin 120. The first and second lugs 17 and 18 project in the radial direction $D_R$ of the turbine ring 1 respectively of the second end 142 of the upstream radial hooking tab 14 and of the second end 162 of the downstream radial hooking tab 16.

The orifices 170 and 180 can be circular or oblong. Preferably the set of orifices 170 and 180 comprises some circular orifices and some oblong orifices. The circular orifices make it possible to tangentially index the rings and prevent them from tangentially moving (particularly if rubbed by the blade). The oblong orifices make it possible to accommodate the differential expansions between the CMC and the metal. CMC has a lower expansion coefficient than that of metal. When hot, the lengths in the tangential direction of the ring segment and of the casing portion opposite will therefore be different. If there were only circular orifices, the metallic casing would impose its displacements on the CMC ring, which would be a source of very high mechanical stresses in the ring segment. Having oblong holes in the ring assembly allows the pin to slide in this hole and avoid the phenomenon of over-stressing mentioned above. Hence, two patterns of drilling can be imagined: a first drilling pattern, for a situation with three lugs, would comprise a circular orifice on one radial hooking tab and two tangential oblong orifices on the other radial hooking tab, and a second drilling pattern, for a situation with at least four lugs, could comprise one circular orifice and one oblong orifice per opposing radial hooking tab each time. Other related situations can also be envisioned.

For each ring segment 10, the two first lugs 17 are positioned at two different angular positions with respect to the axis of revolution of the turbine ring 1. Similarly, for each ring segment 10, the two second lugs 18 are positioned at two different angular positions with respect to the axis of revolution of the turbine ring 1.

For each ring segment 10, the first annular flange 33 and the second annular radial flange 36 further comprise rectilinear bearing surfaces 110 installed on the faces of the first annular flange 33 and of the second annular radial flange 36 in contact respectively with the upstream radial hooking tab 14 and the downstream radial hooking tab 16, i.e. on the downstream face of the first annular flange 33 and on the upstream face of the second annular radial flange 36.

The rectilinear bearings 110 are located under the orifices 3330 for receiving the two first pins 119, inward of the orifices 3330 along the radial direction.

In a variant, the rectilinear bearings could be installed on the faces of the upstream and downstream radial hooking tabs 14 and 16 in contact with the upstream first annular flange 33 and the downstream annular radial flange 36 respectively.

The rectilinear bearings 110 make it possible to have areas of controlled sealing. Specifically, the bearing surfaces 110 between the upstream first annular flange 33 and the upstream radial hooking tab 14, on the one hand, and between the downstream annular radial flange 36 and the downstream radial hooking tab 16 are contained in one and the same rectilinear plane.

More precisely, having bearings on radial planes makes it possible to dispense with the axial tipping effects of the turbine ring 1. Specifically, when the ring tips during operation, the rectilinear bearing makes it possible to preserve a full line of sealing.

The radial retainment of the ring 1 is provided by the first annular flange 33 which is held against the first annular radial flange 32 of the ring support structure 3 and against the upstream radial hooking tab 14. The first annular flange 33 provides the seal between the flow path cavity and the cavity outside the flow path of the ring.

The second annular flange 34 provides the link between the downstream part of the HP NGV, the ring support structure 3, or casing, by radial surface contact, and the first annular flange 33 by axial surface contact.

The ring support structure 3 further comprises radial pins 38 making it possible to keep the ring held in the bottom radial position i.e. toward the flow path, deterministically. There is specifically a clearance between the axial pins and the bores on the ring to offset the differential expansion between the metal and the CMC elements when heated. The radial pins 38 cooperate with orifices 380 made along the radial direction $D_R$ in the central crown 31 of the ring support structure 3.

Figure 6:
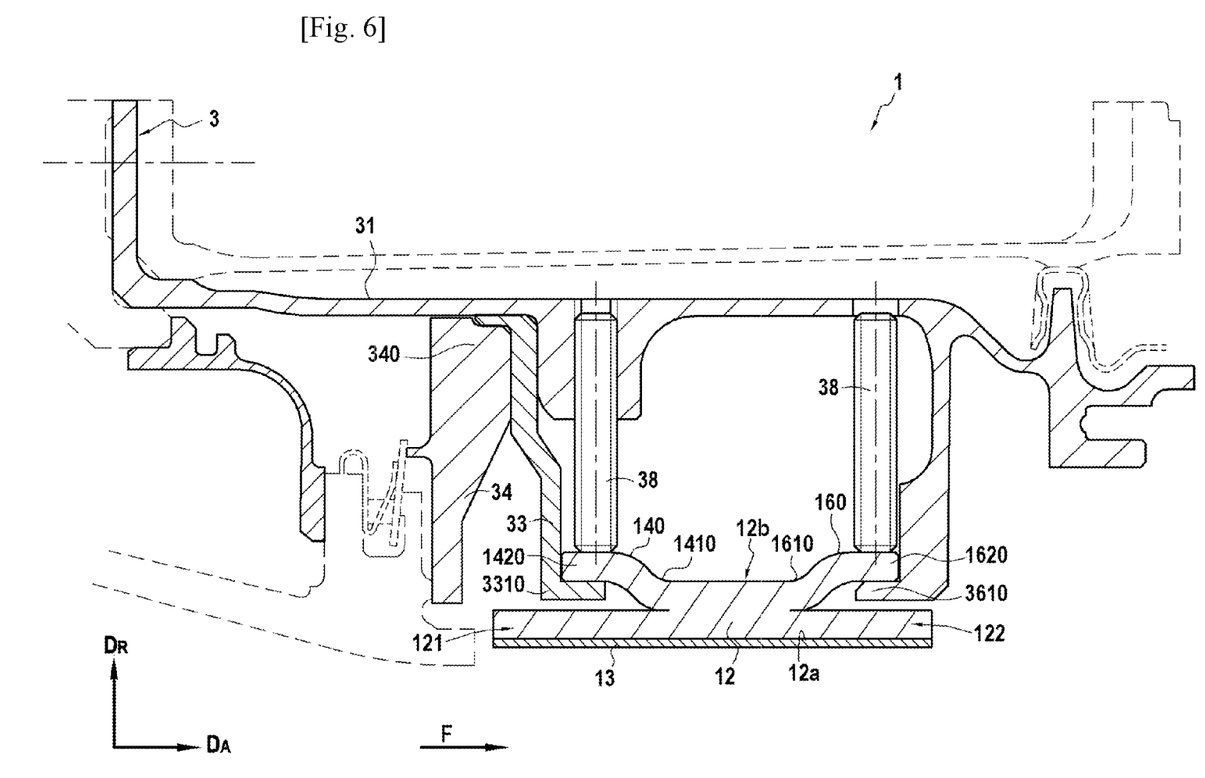
FIG. 6 is a schematic section view of a second embodiment of the turbine ring assembly.

FIG. 6 shows a schematic section view of a second embodiment of the turbine ring assembly.

The second embodiment illustrated in FIG. 6 differs from the first embodiment illustrated in FIGS. 2 to 5 in that the ring segment 10 has, in the plane defined by the axial $D_A$ and radial $D_R$ directions, a K-shaped section comprising an annular base 12 with, along the radial direction $D_R$ of the ring, an inner face 12a coated with a layer 13 of abradable material forming a thermal and environmental barrier and which defines the flow path of the gas flow in the turbine. Upstream and downstream radial hooking tabs 140, 160 substantially S-shaped, extend, along the radial direction $D_R$, from the outer face 12b of the annular base 12 over the entire width thereof and above the upstream and downstream circumferential end portions 121 and 122 of the annular base 12.

The radial hooking tabs 140 and 160 have a first end, respectively referenced 1410 and 1610, forming a single part with the annular base 12 and a second free end, referenced 1420 and 1620 respectively. The free ends 1420 and 1620 of the radial hooking tabs 140 and 160 extend either parallel to the plane in which extends the annular base 12, i.e. along a circular plane, or in a rectilinear manner, whereas the hooking tabs 140 and 160 extend in an annular manner. In this second configuration in which the ends are rectilinear and the hooking tabs annular, in the event of any tipping of the ring during operation, the surface bearings then become linear bearings which offers greater sealing than if they were point bearings. The second end 1620 of the downstream radial hooking tab 160 is retained between a portion 3610 of the second annular radial flange 36 projecting in the axial direction $D_A$ from the first end 361 of the second annular radial flange 36 in the opposite direction to the direction of the flow F and the free end of the associated screw 38, i.e. the screw opposite the screw head. The second end 1410 of the upstream radial hooking tab 140 is retained between a portion 3310 of the first annular flange 33 projecting in the axial direction $D_A$ from the first end 331 of the first annular flange 33 in the direction of the flow F and the free end of the associated screw 38.

Figure 7:
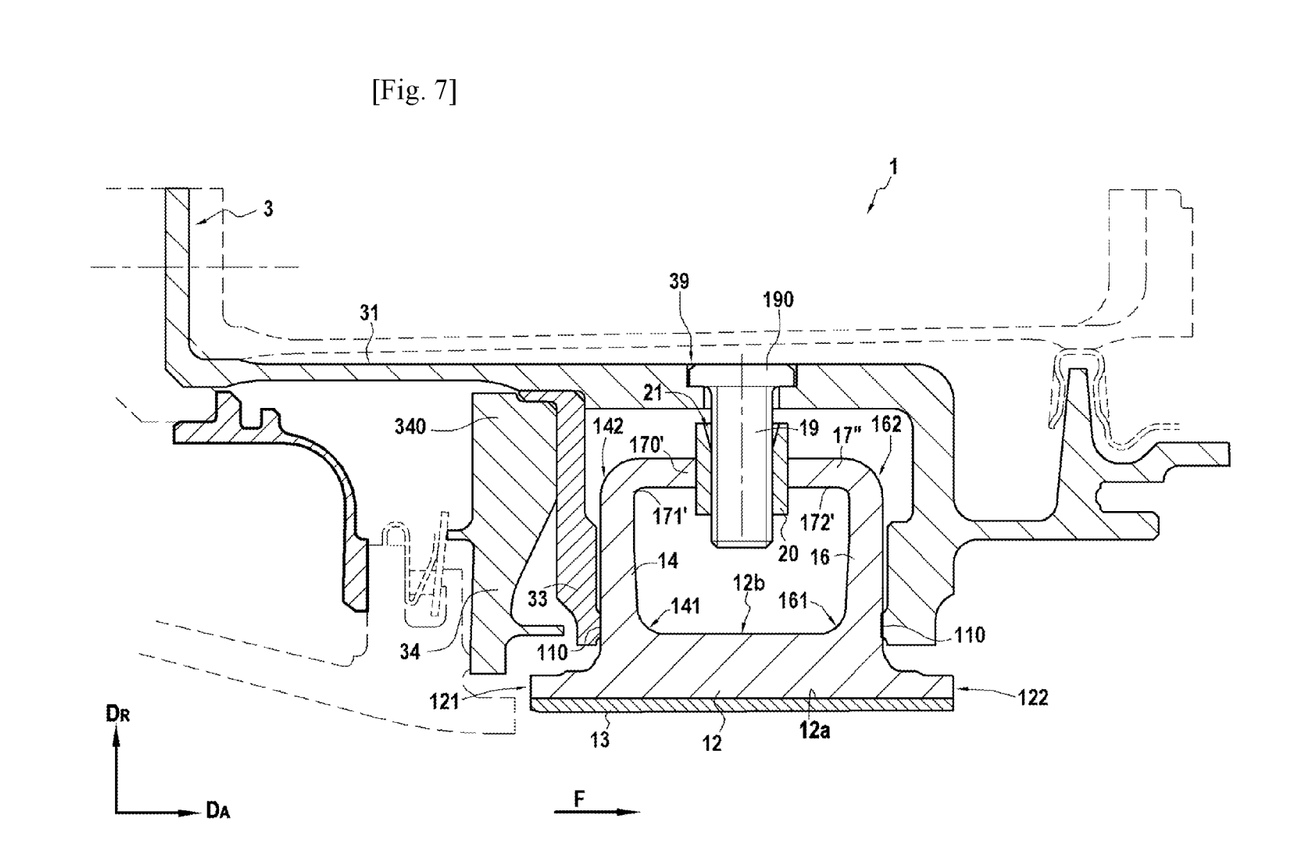
FIG. 7 shows a schematic section view of a third embodiment of the turbine ring assembly.

FIG. 7 shows a schematic section view of an embodiment of the turbine ring assembly.

The third embodiment illustrated in FIG. 8 differs from the first embodiment illustrated in FIGS. 2 to 5 in that the ring segment 10 shows in the plane defined by the axial $D_A$ and radial $D_R$ directions, on a part of the ring segment 10, an O-shaped section instead of a section in the shape of an inverted π, the ring segment 10 being attached to the ring support structure 3 using a screw 19 and an attaching part 20, the screws 38 being no longer present.

In the third embodiment illustrated in FIG. 7, the ring segment 10 comprises an axial hooking tab 17' extending between the upstream and downstream radial hooking tabs 14 and 16. The axial hooking tab 17' extends more precisely, in the axial direction $D_A$, between the second end 142 of the upstream radial hooking tab 14 and the second end 162 of the downstream radial hooking tab 16.

The axial hooking tab 17' comprises an upstream end 171' and a downstream end 172' separated by a central part 170'. The upstream and downstream ends 171' and 172' of the axial hooking tab 17' project, in the radial direction $D_R$, from the second end 142, 162 of the radial hooking tab 14, 16 to which they are coupled, in such a way as to have a central part 170' of the axial hooking tab 17' in elevation with respect to the second ends 142 and 162 of the upstream and downstream radial hooking tabs 14 and 16.

For each ring segment 10, the turbine ring assembly comprises a screw 19 and an attaching part 20. The attaching part 20 is attached to the axial hooking tab 17'.

The attaching part 20 further comprises an orifice 21 provided with a tapped hole cooperating with a thread of the screw 19 to attach the attaching part 20 to the screw 19. The screw 19 comprises a screw head 190 the diameter of which is greater than the diameter of an orifice 39 made in the central shroud 31 of the ring support structure 3 through which the screw 19 is inserted before being screwed to the attaching part 20.

The radial securing of the ring segment 10 to the ring support structure 3 to form a single part is carried out using the screw 19, the head 190 of which is bearing against the central crown 31 of the ring support structure 3, and using the attaching part 20 screwed to the screw 19 and attached to the axial hooking tab 17' of the ring segment 10, the screw head 190 and the attaching part 20 exerting forces of opposite direction to retain together the ring 1 and the ring support structure 3.

In a variant, the radial downward retainment of the ring can be provided using four radial pins pressed against the axial hooking tab 17', and the radial upward retainment of the ring can be provided by a pick head, forming a single part with the screw 19, placed under the ring in the cavity between the axial hooking tab 17' and the outer face 12b of the annular base.

In the second and third embodiments illustrated in FIGS. 6 and 7, the second end 342 of the second annular flange 34 comprises a contact stop 340 projecting in the axial direction $D_A$ between the second annular flange 34 and the first annular flange 33. The contact stop 340 is used to maintain a distance between the first end 331 of the first annular flange 33 and the first end 341 of the second annular flange 34 in the event of tipping of the second annular flange 34 incurred by the HP NGV force.

There will now be described a method for producing a turbine ring assembly corresponding to that represented in FIG. 2, i.e. according to the first embodiment illustrated in FIGS. 2 to 5.

Each ring segment 10 described above is made of ceramic matrix composite (CMC) material by forming a fiber preform having a similar shape to that of the ring segment and densifying the ring segment with a ceramic matrix.

To produce the fiber preform, ceramic fiber threads or carbon fiber threads can be used.

The fiber preform is advantageously produced by three-dimensional weaving, or multi-layer weaving with fashioning of loosening areas making it possible to keep apart the areas of the preforms corresponding to the hooking tabs 14 and 16 of the segments 10.

The weaving can be of interlock type, as illustrated. Other three-dimensional or multi-layer weaves can be used such as for example multi-web or multi-satin weaves. The reader is referred to the document WO 2006/136755.

After weaving, the blank can be shaped to obtain a ring segment preform which is consolidated and densified by a ceramic matrix, the densifying being able to be produced in particular by Chemical Vapor Infiltration (CVI) which is well-known per se. In a variant, the textile preform can be slightly hardened by CVI so that it is stiff enough to be handled, before making liquid silicone rise up through the textile by capillary effect to perform the densification (Melt Infiltration).

A detailed example of manufacturing of CMC ring segments is in particular described in the document US 2012/0027572.

The ring support structure 3 is itself made of a metallic material such as a nickel-, cobalt- or titanium-based alloy.

The production of the turbine ring assembly continues with the installation of the ring segments 10 on the ring support structure 3.

To do this, the ring segments 10 are assembled together on an annular tool of "spider" type including, for example, suckers configured to each retain a ring segment 10.

Then the second pins 120 are inserted into the two orifices 3650 provided in the second part 365 of the second annular radial flange 36 of the ring support structure 3.

The ring 1 is then installed on the ring support structure 3 by inserting each pin 120 into each of the orifices 180 of the second lugs 18 of the downstream radial attachment flanges 16 of each reach section 10 forming the ring 1.

Next all the first pins 119 are placed in the orifices 170 for which provision is made in the first lugs 17 of the radial hooking tab 14 of the ring 1.

Next, the first annular flange 33 is positioned by placing the second portion 334 of the first annular flange 33 bearing against the first radial flange and the rectilinear bearings 110 of the first portion 333 of the first annular flange 33 bearing against the first hooking tab 14 by adjusting the first annular flange 33 so that the first pins 117 are inserted into the orifices 3330 of the first portion 333 of the first annular flange 33.

Next the second annular flange 34 is positioned against the first annular flange 33 by inserting the radial centering dogs 3425 of the second annular flange 34 into each of the notches 3325 of the first annular flange 34. Then, to attach the two upstream flanges 33 and 34 together to the ring support structure 3, screws 60 are inserted into the orifices 3440, 3340 and 320, coaxial, into the second portion 344 of the second upstream flange 34, into the second portion 334 of the first flange and into the upstream annular radial flange 32 and each of the screws 60 is tightened using a nut 61.

The ring 1 is thus retained in position axially using the first annular flange 33 and the second annular radial flange 36 bearing respectively upstream and downstream on their respective rectilinear bearings 110. During the installation of the first annular flange 33, axial pre-stressing can be applied to the first annular flange 33 and to the upstream radial hooking tab 14 to palliate the effect of differential expansion between the CMC material of the ring 1 and the metal of the ring support structure 3. The first annular flange 33 is retained under axial stress by mechanical elements placed upstream as illustrated in dotted lines in FIGS. 6 and 7.

The ring 1 is retained in position radially using the first and second pins 119 and 120 cooperating with the first and second lugs 17 and 18 and orifices 3340 and 3650 of the first annular flange 33 and the annular radial flange 36.

The invention thus provides a turbine ring assembly making it possible to retain each ring segment deterministically while allowing, on the one hand, the ring segment, and by extension the ring, to distort under the effects of increases in temperature and variations in pressure, and this, in particular, independently of the metallic parts at the interface, and, on the other hand, while improving the sealing between the segment outside the flow path and the segment in the flow path, in particular the sealing of the cavity located at the radially upper part of the ring. All this is achieved while simplifying the manipulations reducing the number of manipulations for the installation of the ring assembly.

The invention further provides a turbine ring assembly provided with an annular flange making it possible, on the one hand, to provide optimal sealing of the cavity defined by the ring, and, on the other hand, to efficiently accommodate the different axial lengths of each CMC ring segment composing the ring crown. In other words for this second point, the rectilinear contact between the upstream part of the ring and the tab of the upstream flange must be effective for each ring segment, although these have different widths, these widths being specifically affected by manufacturing tolerances.

The invention claimed is:

1. A turbine ring assembly comprising a plurality of ring segments made of ceramic matrix composite material forming a turbine ring and a ring support structure, each ring segment having, along a section plane defined by an axial direction and a radial direction of the turbine ring, a part forming an annular base which includes, in the radial direction of the turbine ring, a radially inner face defining an inner face of the turbine ring and a radially outer face from which project a first and a second hooking tab, the ring support structure including:
   a central shroud from which project a first and a second radial flange from which are retained the first and second hooking tabs of each ring segment,
   a first annular flange made of one part disposed upstream of the turbine ring and upstream of the first radial flange with respect to the direction of an air flow intended to traverse the turbine ring assembly, and having in the radial direction a first free end, a second end opposite the first end, and
   a second annular flange disposed upstream of the first flange and having a first free end, a second end opposite the first end, an upstream face and a downstream face both extending in the radial direction, the second ends of the first and second flanges being removably attached to said first radial flange,
   wherein the first flange comprises a shoulder projecting in the axial direction upstream from the second end of the first flange, and the second flange comprises a recess on a corner formed at a junction between the second end and the downstream face of the second flange, said recess forming an axial stop configured to cooperate by interlocking with said shoulder in the axial direction.

2. The assembly as claimed in claim 1, wherein the first flange further comprises a first portion extending from the first end, and a second portion extending between the first portion and the second end, the first portion bearing against the first hooking tab, the second portion being attached to the first radial flange, and the first portion comprising a plurality of radial slots opening onto said first end of the first flange and delimiting segments of the first portion of the first flange.

3. The assembly as claimed in claim 2, wherein the first flange further comprises an inter-segment seal for each radial slot of the first flange, each radial slot having a first and a second surface parallel in the radial direction and in the axial direction, the first surface comprising a first groove and the second surface comprising a second groove extending symmetrically with the first groove with respect to a plane extending in the axial direction and in the radial direction along the radial slot, a first portion of the inter-segment seal being inserted into the first groove and a second portion of the inter-segment seal being inserted into the second groove.

4. The assembly as claimed in claim 3, wherein the first flange comprises, plumb with each radial slot, a notch made in the shoulder, the notch extending in a plane comprising a circumferential direction of the turbine ring and the axial direction and intersecting a plane comprising the axial direction and the radial direction and traversing the radial slot.

5. The assembly as claimed in claim 4, wherein the recess of the second flange is segmented in the circumferential direction into a plurality of recess segments adjacent in the circumferential direction, two recess segments adjacent in the circumferential direction being separated by a radial centering dog forming a stop in a circumferential direction of the turbine ring and shaped to cooperate with the notch of the first flange in the circumferential direction, each radial centering dog, extending from the recess projecting in the radial direction and in the axial direction downstream.

6. The assembly as claimed in claim 5, wherein each notch comprises, in a plane comprising the circumferential direction and the axial direction of the turbine ring, two parallel side walls extending along the axial direction and a bottom wall extending along the circumferential direction between the two side walls, the side walls of the notch being each connected to the bottom wall in a way that makes an arc.

7. The assembly as claimed in claim 2, wherein the first flange comprises, for each radial slot, a discharge orifice, and each radial slot opens onto the first end of the first flange and into the discharge orifice.

8. The assembly as claimed in claim 7, wherein the discharge orifices are circular orifices having a diameter between 0.5 mm and 10 mm.

9. The assembly as claimed in claim 8, wherein the diameter of the circular orifices are between 1 mm and 5 mm.

10. The assembly as claimed in claim 1, wherein the first end of the second flange is distant from the first end of the first flange in the axial direction.

11. The assembly as claimed in claim 1, wherein the first flange has a thickness in the axial direction less than the thickness in the axial direction of the second flange.

12. The assembly as claimed in claim 1, wherein the second radial flange of the ring support structure has a first free end and a second end forming a single part with the central shroud of the ring support structure, the first end of the second radial flange being in contact with the second hooking tab of the turbine ring and having a thickness in the axial direction greater than the thickness of the first end of the first flange.

13. The assembly as claimed in claim 1, wherein the ring segment has a section in the shape of TT along the section plane defined by the axial direction and the radial direction, and the assembly comprises, for each ring segment, at least three pins to radially maintain the ring segment in position, the first and second hooking tabs of each ring segment each comprising a first end forming a single part with the outer face of the annular base, a second free end, at least three lugs for receiving said at least three pins, at least two lugs projecting from the second end of one of the first or second hooking tabs in the radial direction of the turbine ring and at least one lug projecting from the second end of the other hooking tab in the radial direction of the turbine ring, each receiving lug including an orifice for receiving one of the pins.

14. The assembly as claimed in claim 1, wherein the ring segment has a section shaped like a K along the section plane defined by the axial direction and the radial direction, the first and second hooking tabs having the shape of an S.

15. The assembly as claimed in claim 1, wherein the ring segment has a section in the shape of an O along the section plane defined by the axial direction and the radial direction, the first and second hooking tabs each having a first end forming a single part with the outer face and a second free end, and each ring segment comprising a third and a fourth hooking tab each extending, in the axial direction of the turbine ring, between a second end of the first hooking tab and a second end of the second hooking tab, each ring segment being attached to the ring support structure by an attaching screw including a screw head bearing against the ring support structure and a thread cooperating with a tapped hole made in an attaching plate, the attaching plate cooperating with the third and fourth hooking tabs.

16. A turbomachine comprising the turbine ring assembly as claimed in claim 1.

* * * * *

UNITED STATES PATENT AND TRADEMARK OFFICE
CERTIFICATE OF CORRECTION

| | |
|---|---|
| PATENT NO. | : 11,286,813 B2 |
| APPLICATION NO. | : 17/296467 |
| DATED | : March 29, 2022 |
| INVENTOR(S) | : Danis et al. |

It is certified that error appears in the above-identified patent and that said Letters Patent is hereby corrected as shown below:

In the Claims

Column 18 Line 12 Claim 13, should recite:
13. The assembly as claimed in claim 1, wherein the ring segment has a section in the shape of $\pi$ along the section plane defined by the axial direction and the radial direction, and the assembly comprises, for each ring segment, at least three pins to radially maintain the ring segment in position, the first and second hooking tabs of each ring segment each comprising a first end forming a single part with the outer face of the annular base, a second free end, at least three lugs for receiving said at least three pins, at least two lugs projecting from the second end of one of the first or second hooking tabs in the radial direction of the turbine ring and at least one lug projecting from the second end of the other hooking tab in the radial direction of the turbine ring, each receiving lug including an orifice for receiving one of the pins.

Signed and Sealed this
Tenth Day of May, 2022

Katherine Kelly Vidal
*Director of the United States Patent and Trademark Office*